United States Patent
Ito

(10) Patent No.: US 8,159,916 B2
(45) Date of Patent: Apr. 17, 2012

(54) FORMAT DETERMINING APPARATUS

(75) Inventor: Kazunari Ito, Neyagawa (JP)

(73) Assignee: Onkyo Corporation, Osaka (JP)

( * ) Notice: Subject to any disclaimer, the term of this patent is extended or adjusted under 35 U.S.C. 154(b) by 0 days.

(21) Appl. No.: 13/024,394

(22) Filed: Feb. 10, 2011

(65) Prior Publication Data

US 2011/0255381 A1    Oct. 20, 2011

(30) Foreign Application Priority Data

Apr. 15, 2010    (JP) ................... 2010-093769

(51) Int. Cl.
*G11B 7/00*    (2006.01)
(52) U.S. Cl. ........................... 369/53.2
(58) Field of Classification Search .......... 369/53.2, 369/53.22, 47.55, 59.13, 59.14, 53.37, 53.12
See application file for complete search history.

(56) References Cited

U.S. PATENT DOCUMENTS

| | | | | |
|---|---|---|---|---|
| 5,777,955 A * | 7/1998 | Ikeda et al. | ................. | 369/53.22 |
| 5,841,742 A * | 11/1998 | Tsukihashi et al. | ......... | 369/30.28 |
| 6,018,506 A * | 1/2000 | Okabe et al. | ................. | 369/30.23 |
| 6,151,442 A * | 11/2000 | Ueno et al. | ..................... | 386/327 |
| 6,285,637 B1 * | 9/2001 | Manter et al. | ................. | 369/53.2 |
| 2001/0003519 A1 * | 6/2001 | Tsukihashi | ................. | 369/53.36 |
| 2003/0002417 A1 * | 1/2003 | Takeshi | ........................ | 369/59.13 |
| 2003/0123356 A1 * | 7/2003 | Nonaka | ......................... | 369/53.2 |
| 2005/0135213 A1 * | 6/2005 | Shishido | ....................... | 369/53.2 |

FOREIGN PATENT DOCUMENTS

JP    2003-077221    3/2003

* cited by examiner

*Primary Examiner* — Thang Tran
(74) *Attorney, Agent, or Firm* — Renner, Otto, Boisselle & Sklar, LLP

(57) ABSTRACT

A pick-up of a format determining apparatus irradiates light to an optical disk to generate a reproduction signal. A signal processing unit decodes the reproduction signal to generate main data. A CD-ROM decoder decodes the main data. A CD-ROM determining unit determines whether or not the main data is in a CD-ROM format, based on the decoded main data. A reproduction signal determining unit determines whether or not the reproduction signal is normal when the main data is not in the CD-ROM format. A system control unit determines that the main data is in a CD-DA format, when the main data is not in the CD-ROM format, and when the reproduction signal is normal.

4 Claims, 6 Drawing Sheets

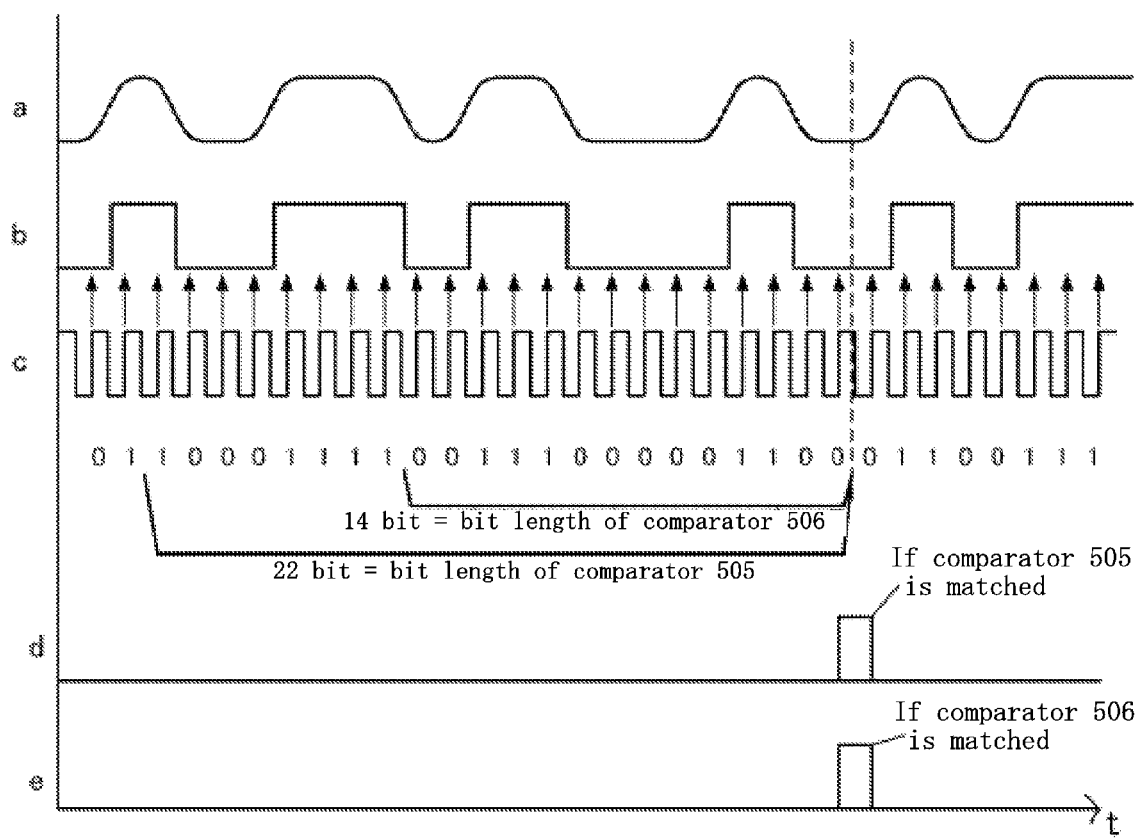

FORMAT DETERMINING APPARATUS

BACKGROUND OF THE INVENTION

1. Field of the Invention

The present invention relates to a format determining apparatus, and more particularly to a format determining apparatus that determines a format of data recorded on an optical disk.

2. Description of the Related Art

Some optical disk reproducing apparatuses represented by a CD (Compact Disk) player can reproduce data in a CD-DA (Compact Disk Digital Audio) format as well as data in a CD-ROM (Compact Disk Read Only Memory) format. The above-described optical disk reproducing apparatus is disclosed in, for example, Japanese Patent Application Laid-Open No. 2003-77221 (Patent Literature 1).

The above-described optical disk reproducing apparatus includes a signal processing unit for reproducing CD-DA format data as well as a CD-ROM decoder. Suppose that data at a physical position specified by a predetermined subcode address on a loaded optical disk is read by a pick-up. When the read data is in the CD-DA format, the optical disk reproducing apparatus converts main data decoded by the signal processing unit to an analog signal, and then outputs the same outside. On the other hand, when the data at the physical position specified by the subcode address is in the CD-ROM format, the optical disk reproducing apparatus further decodes, by the CD-ROM decoder, a digital signal decoded by the signal processing unit, and outputs the same outside.

In short, the optical disk reproducing apparatus including the CD-ROM decoder executes different types of processing between when the data recorded on the optical disk is in the CD-DA format, and when the data is in the CD-ROM format. Accordingly, when the data of the optical disk is reproduced, the format (CD-DA or CD-ROM) of the data needs to be specified.

The optical disk reproducing apparatus disclosed in Japanese Patent Application Laid-Open No. 2003-77221 determines whether or not the data decoded by the CD-ROM decoder includes a sync signal. Although the sync signal is included in the data in the CD-ROM format, it is not included in the data in the CD-DA format. Accordingly, the format of the data can be determined.

As a result of the above-described determination based on sync signal, when the decoded data does not include the sync signal, the data is determined not to be in the CD-ROM format. In this case, however, it is unclear whether the data is in the CD-DA format or the pick-up has failed in the generation of a reproduction signal for some reason. Thus, in the conventional optical disk reproducing apparatus, when the decoded data is not in the CD-ROM format, the above-described determination processing is repeated a plurality of times in view of the case where the pick-up has failed in the generation of the reproduction signal. It requires some time.

SUMMARY OF THE INVENTION

An object of the present invention is to provide a format determining apparatus capable of reducing determination time.

A format determining apparatus as a preferred embodiment of the present invention capable of decoding data in a CD-DA format and data in a CD-ROM format, comprises: a pick-up that irradiates light to an optical disk to generate a reproduction signal in accordance with reflected light; a signal processing unit that decodes said reproduction signal to generate main data; a main data decoding unit that decodes said main data; a CD-ROM determining unit that determines whether or not said main data is in the CD-ROM format, based on said decoded main data; a reproduction signal determining unit that determines whether or not said reproduction signal is normal when said main data is not in the CD-ROM format; and a format determining unit that determines that said main data is in the CD-DA format when said main data is not in the CD-ROM format and when said reproduction signal is normal.

Preferably the data in said CD-ROM format includes a sector number and a subcode address corresponding to the sector number, and the data in said CD-DA format includes said subcode address, said pick-up irradiates the light to physical positions of said optical disk indicated by a plurality of subcode address corresponding to a plurality of sector numbers in a predetermined range including a selected sector number to generate a plurality of reproduction signals, and when the main data corresponding to each of said physical positions is not in the CD-ROM format, and when each of said reproduction signals corresponding to each of said physical positions is normal, said format determining unit determines that said main data is in the CD-DA format.

Preferably said reproduction signal determining unit determines that said reproduction signal is normal when an amplitude of said reproduction signal is larger than a reference value.

Preferably said reproduction signal determining unit further comprises a detection unit that samples said reproduction signal to detect a signal of the same bit pattern as that of a sync signal, and said reproduction signal determining unit determines that the reproduction signal is normal when a cycle of said detected signal is the same as a cycle of the sync signal.

The format determining apparatus according to the present invention determines whether or not the reproduction signal is normal, when the main data is not in the CD-ROM format. When the reproduction signal is normal, the format determining unit determines that the main data is in the CD-DA format. Thus, the format determining apparatus can suppress retrial of determination processing, thereby reducing determination time.

Mismatch within a predetermined range between the sector number and the subcode address in the CD-ROM data is accepted on the standard. Accordingly, by generating the reproduction signals, based on the plurality of subcode addresses corresponding to the plurality of sector numbers within the predetermined range including the selected sector number to determine the data format, the determination can be quickly performed, when the selected sector number is in the CD-DA format.

BRIEF DESCRIPTION OF THE DRAWINGS

FIG. 6 is a timing chart diagram of signals generated in the reproduction signal determining unit shown in FIG. 5.

DETAILED DESCRIPTION OF THE PREFERRED EMBODIMENTS

Figure 1:
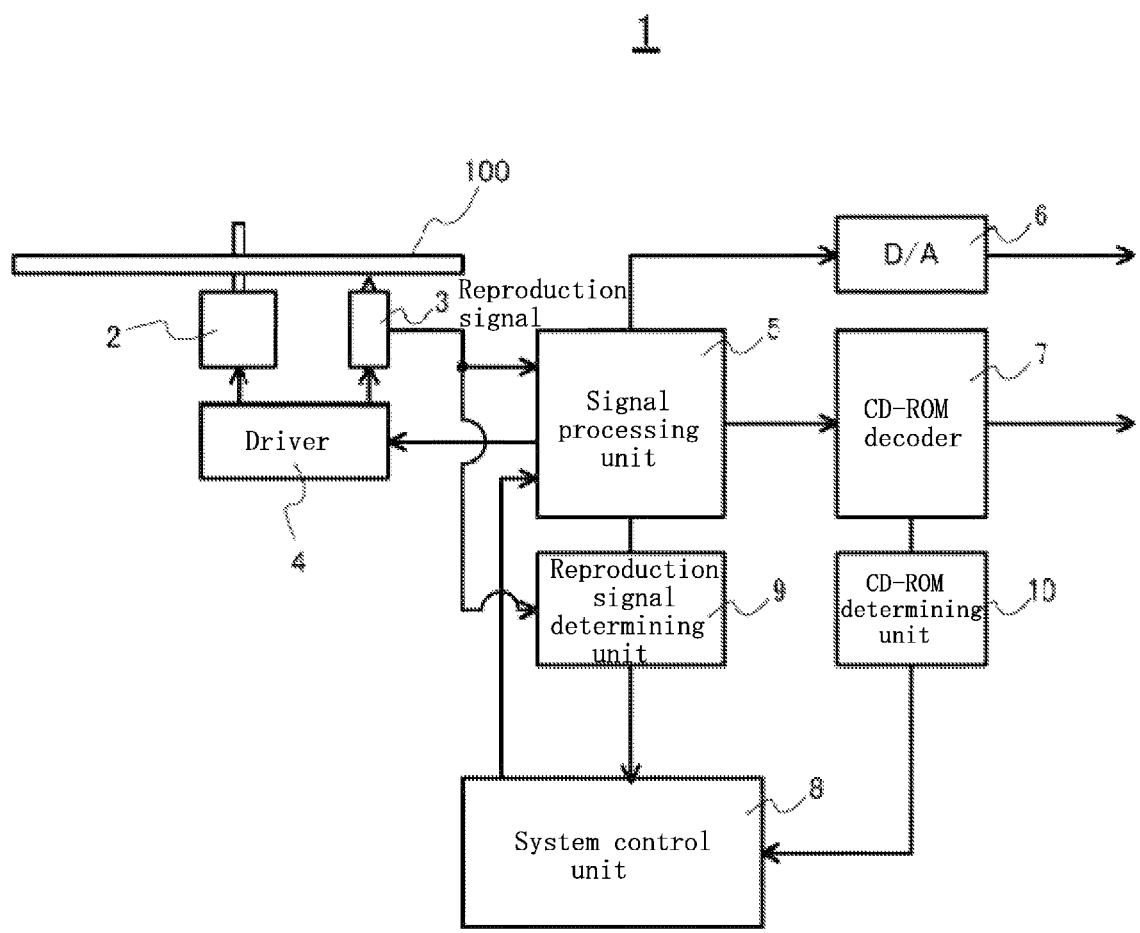
FIG. 1 is an overall configuration diagram of a format determining apparatus according to a first embodiment of the present invention.

Hereinafter, referring to the drawings, embodiments of the present invention are described in detail. The same reference numerals are given to identical units and corresponding units in the figures, the descriptions of which are not repeated.

First Embodiment

Configuration of Format Determining Apparatus

A configuration diagram of a format determining apparatus 1 according to the present embodiment is shown in FIG. 1. The format determining apparatus 1 is mounted on an optical disk reproducing apparatus represented by a CD player. Referring to FIG. 1, the format determining apparatus 1 includes a motor 2, a pick-up 3, a driver 4, a signal processing unit 5, a D/A conversion unit 6, a CD-ROM decoder 7, a system control unit 8, a reproduction signal determining unit 9, and a CD-ROM determining unit 10.

The motor 2 rotates an optical disk 100. The pick-up 3 irradiates laser light to a desired position on the optical disk and receives reflected light to generate a reproduction signal. The reproduction signal here is an electric signal. Specifically, the pick-up 3 has a semiconductor laser, an objective lens, actuators (a focus actuator and a track actuator), and a light-receiving element, which are not shown. The pick-up 3 arranges the objective lens at a desired physical position on the optical disk 100 by the motor 2 and the respective actuators controlled by the driver 4. The pick-up 3 irradiates the laser light to the optical disk 100. The light-receiving element receives the reflected light of the laser light. The pick-up 3 generates the reproduction signal in accordance with intensity of the received reflected light.

The signal processing unit 5 generates an RF signal from the reproduction signal. Normally, the light-receiving element of the pick-up 3 includes a plurality of photodetectors. The signal processing unit 5 includes an addition amplifier not shown. The addition amplifier generates the RF signal by adding the plurality of reproduction signals. The signal processing unit 5 further decodes the RF signal. Specifically, the signal processing unit 5 subjects the RF signal to EFM (Eight to Fourteen Modulation) demodulation. The signal processing unit 5 further executes error correction processing to the decoded data. The decoded data includes a subcode and main data. The subcode includes address information (a subcode address) of the read main data. The subcode address is, for example, time information, and is expressed, for example, in a unit of "aa minutes bb seconds cc frames".

When the data is in a CD-DA format, the signal processing unit 5 outputs the main data to the D/A conversion unit 6 in response to an instruction of the system control unit 8. On the other hand, when the main data is in a CD-ROM format, the signal processing unit 5 outputs the main data to the CD-ROM decoder 7 in response to an instruction of the system control unit 8.

The CD-ROM decoder 7 receives and decodes the main data outputted from the signal processing unit 5. Specifically, the CD-ROM decoder 7 executes the error correction processing to the main data. The error correction processing is executed to the data in the CD-ROM format twice by the signal processing unit 5 and the CD-ROM decoder 7. The main data decoded by the CD-ROM decoder 7 is outputted, for example, to a computer or the like not shown.

The optical disk 100 is, for example, a well-known CD (Compact Disk). The optical disk 100 may record the data in the CD-DA format, or may record the data in the CD-ROM format. Furthermore, the CD-DA format data and the CD-ROM format data may be recorded in combination.

The CD-ROM determining unit 10 determines whether or not the main data decoded by the CD-ROM decoder 7 is in the CD-ROM format.

When the main data decoded by the CD-ROM decoder 7 is not in the CD-ROM format, the reproduction signal determining unit 9 determines whether or not the reproduction signal is normal. When the decoded main data is not in the CD-ROM format, the data read from the optical disk 100 is in the CD-DA format, or the pick-up 3 cannot normally read the data from the optical disk 100 for some reason. For example, when the pick-up 3 cannot execute normal operation due to impact from the outside or the like, or when there is dirt or a scratch on the optical disk 100, the pick-up 3 cannot normally read the data from the optical disk 100. In this case, the reproduction signal becomes a signal of a waveform different from that at the normal time. Thus, the RF signal also becomes a signal of a different waveform from that at the normal time. Consequently, the reproduction signal determining unit 9 determines whether or not the reproduction signal is normal, based on the RF signal.

The system control unit 8 controls the overall format determining apparatus 1. The system control unit 8 determines the format of the data read from the optical disk 100. Specifically, when the decoded main data is not in the CD-ROM format and when the reproduction signal is normal, the system control unit 8 determines the read data to be in the CD-DA format.

After determining the format of the data, the system control unit 8 specifies an output destination of the main data to the signal processing unit 5. When the data is in the CD-DA format, the system control unit 8 instructs the signal processing unit 5 to output the generated main data to the D/A conversion unit 6. This allows the CD-DA format data (e.g., audio data) to be outputted outside through a speaker not shown.

On the other hand, when the data is in the CD-ROM format, the system control unit 8 instructs the signal processing unit 5 to output the main data to the CD-ROM decoder 7.

The signal processing unit 5, the CD-ROM decoder 7, the system control unit 8, the reproduction signal determining unit 9 and the CD-ROM determining unit 10 may be configured as hardware, or may be configured as software implemented by causing the computer to execute a format program. When the above-described substantial units are configured as software, the format determining unit 1 includes a central processing unit (CPU), a memory and a hard disk not shown. A format determining program stored in the hard disk or in the memory is executed, by which the above-described substantial units 5, 7 to 10 are implemented.

[Operation Overview of Format Determining Apparatus]

The format determining apparatus 1 determines whether or not the decoded main data is in the CD-ROM format, and when the main data is not in the CD-ROM format, the format determining unit 1 further determines whether or not the reproduction signal is normal, based on the RF signal. This can reduce determination time when the data read from the optical disk 100 is in the CD-DA format. Hereinafter, operation overview of the format determining apparatus is described.

[CD-DA Format and CD-ROM Format]

First, a data structure of the CD-DA format and a data structure of the CD-ROM format are described.

The data of one subcode frame after the reproduction signal read from the optical disk 100 by the pick-up 3 is subjected to EFM decoding and the error correction processing includes the main data made up of 98 frames and a subcode which is collateral information of the main data. The subcode includes a subcode address indicating a physical position on the optical disk 100 of the main data. As described above, the subcode address is time information, and is expressed in a unit of "aa minutes bb seconds cc frames". In the case of the CD-DA format, the main data is only audio data.

On the other hand, in the case of the CD-ROM format, the main data is data of one sector made up of 98 frames. The main data (sector data) in the CD-ROM format includes a sync pattern, a sector number indicating a physical position on the optical disk 100 of the sector, user data, and data for error correction processing (error detection code (EDC) and error correction code (ECC)). That is, although the CD-ROM format has the sync pattern and the sector number, in the CD-DA format, these types of data do not exist. This is because the CD-DA format has no concept of the sector structure.

A data amount of one subcode frame in the CD-DA format is equal to a data amount of one sector in the CD-ROM format. That is, one sector in the CD-ROM format corresponds to one subcode frame in the CD-DA format.

As described above, the data in the CD-ROM format includes the subcode and the main data, and further the main data includes the sync pattern, the sector number, the user data and the data for error correction processing. Accordingly, the data in the CD-ROM format includes the sector number and the subcode address. The sector number can be expressed in the unit of "aa minutes bb seconds cc frames" as with the subcode address. The physical position indicated by the sector number, in principal, matches the physical position indicated by the subcode address.

However, because of problems such as encode processing and the like, the physical position indicated by the sector number does not necessarily match the physical position indicated by the subcode address, causing mismatch. In the standard of the CD-ROM format (Yellow Book), the subcode address is permitted to have mismatch within sector number + or −10 frames.

[Determination Operation Overview]

As described above, in the CD-ROM format, the sync pattern exists, while in the CD-DA format, it does not exist. Consequently, there is a method in which the optical disk reproducing apparatus detects the sync pattern in the decoded data to thereby determine the data format.

However, when the sync pattern cannot be detected, it is unclear whether the data is in the CD-DA format or the pick-up cannot normally read the data of the optical disk 100. As described above, if at the physical position on the optical disk 100 corresponding to the selected sector number, dirty is attached or a scratch is formed, the pick-up cannot normally read the data. In this case, the sync pattern is not included in the data. Similarly, when the data normally read is in the CD-DA format, the sync pattern is not included, either.

The conventional optical disk reproducing apparatus retries the determination processing in the above-described situation. That is, the conventional optical disk reproducing apparatus again irradiates beam light to the physical position corresponding to the selected sector number to reacquire the reproduction signal and repeat the determination processing. Thus, when the data is not in the CD-ROM format, the determination processing takes longer time.

The format determining apparatus 1 according to the present embodiment reduces the determination time by the following method. The CD-ROM determining unit 10 in the format determining apparatus 1 determines whether or not the decoded main data is in the CD-ROM format. Specifically, the CD-ROM determining unit 10 determines whether or not the main data decoded by the CD-ROM decoder 7 includes the sync pattern.

If the decoded main data does not include the sync pattern, the reproduction signal determining unit 9 determines whether or not the reproduction signal outputted from the pick-up 3 is normal, based on the RF signal. If the reproduction signal is normal, the pick-up 3 has normally read the data from the optical disk 100. The system control unit 8, therefore, determines that the data recorded at the physical position corresponding to the selected sector number is in the CD-DA format.

In the above-described operation, even when the sync pattern cannot be detected, the determination processing is not repeatedly executed if the pick-up 3 has normally read the data. Accordingly, the determination time can be reduced.

There are various determination methods as to whether or not the RF signal is normal, for example, as follows.

(1) The reproduction signal determining unit 9 compares a peak level of the RF signal with a reference level. If the peak level of the RF signal is higher than the reference level, the reproduction signal determining unit 9 determines that the reproduction signal is normal. On the other hand, if the peak level of the RF signal is lower than the reference level, the reproduction signal determining unit 9 determines that the reproduction signal is abnormal.

(2) The reproduction signal determining unit 9 determines whether or not the reproduction signal is normal, based on an amplitude of the RF signal. Specifically, if the amplitude of the RF signal is larger than a reference value, the reproduction signal determining unit 9 determines that the reproduction signal is normal. On the other hand, if the amplitude of the RF signal is smaller than the reference level, the reproduction signal determining unit 9 determines that the reproduction signal is abnormal.

(3) The sync signal is periodically included in the RF signal. The sync signal is, for example, a frame sync signal or a subcode frame sync signal. A cycle of the frame sync signal is $1/7350$ second, and a cycle of the subcode frame sync signal is $1/75$ second. The reproduction signal determining unit 9 detects the cycle of the signal having the same bit pattern as a bit pattern of the above-described sync signal, based on the RF signal. If the detected cycle matches the cycle of the frame sync signal or the cycle of the subcode frame sync signal, the reproduction signal determining unit 9 determines that the reproduction signal is normal.

(4) The reproduction signal determining unit 9 determines whether or not the reproduction signal is normal, based on an error rate of the RF signal. Specifically, the reproduction signal determining unit 9 compares the error rate of the RF signal with a reference value, and if the error rate is less than the reference value, the reproduction signal determining unit 9 determines that the reproduction signal is normal.

(5) If no uncorrectable error is detected in a predetermined time period, the reproduction signal determining unit 9 determines that the reproduction signal is normal.

In the format determining apparatus 1, the one, two or more methods of the above-described determination methods of (1) to (5) is (are) executed.

[Details of Determination Processing of Format Determining Apparatus 1]

Figure 2:
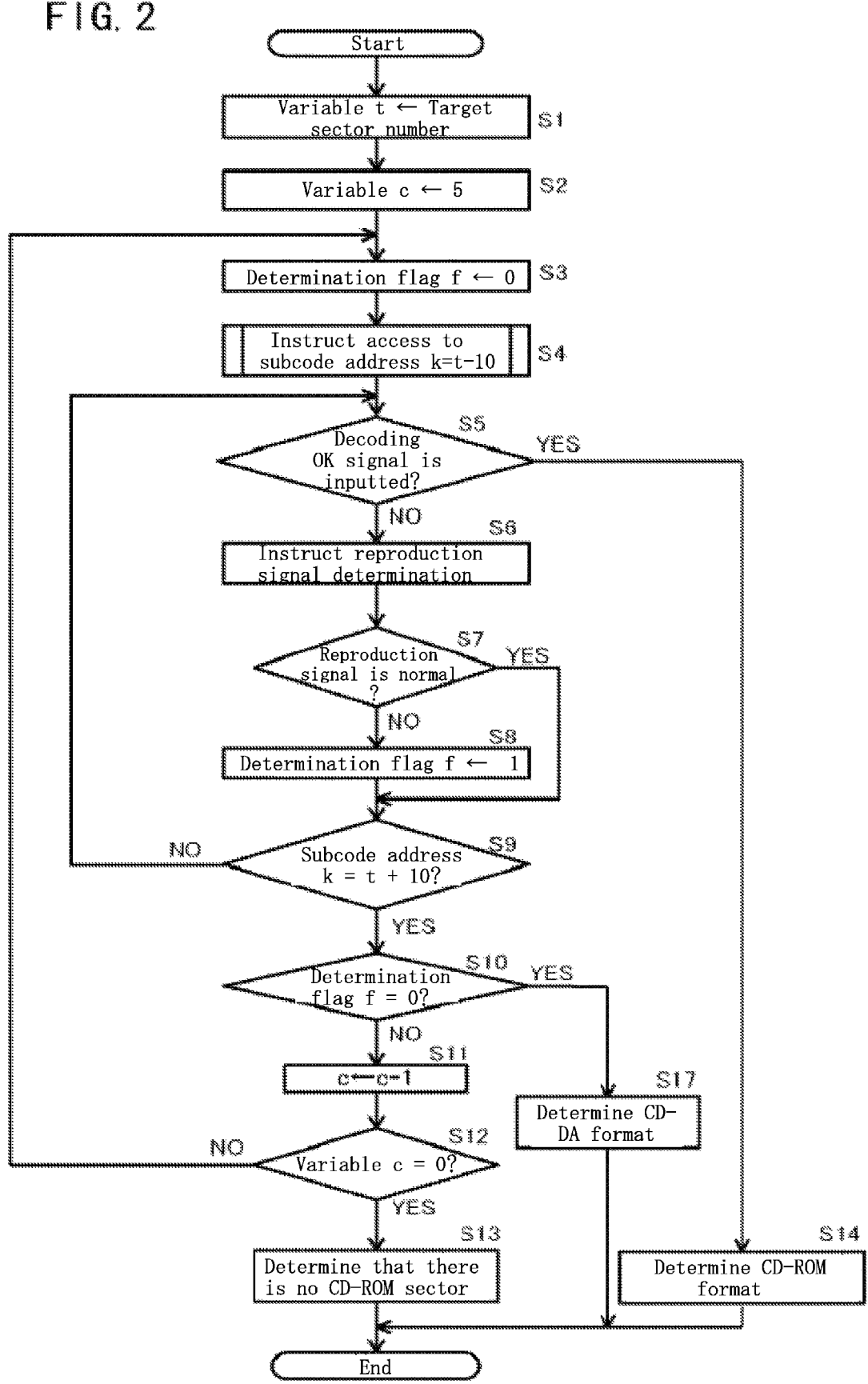
FIG. 2 is a flowchart showing operation of the format determining apparatus shown in FIG. 1.

FIG. 2 is a flowchart showing details of the determination processing of the format determining apparatus 1. Referring to FIG. 2, the sector number to be sought is selected (S1). The selection of the sector number may be automatically executed by the format determining apparatus 1, or may be executed by user operation. At this time, the system control unit 8 stores the selected sector number as a "variable t" in a memory in the system control unit 8.

Subsequently, a number of times of retrial of the determination processing is set (S2). While in the present embodiment, the number of times of the retrial is "5", the number of times of the retrial is not limited thereto. The system control unit 8 stores the number of times of the retrial in the memory as a "variable c".

Subsequently, the system control unit 8 resets a determination flag f to be "0" (S3). The determination flag f is a flag indicating whether or not the RF signal is normal. The determination flag f of "0" indicates that the RF signal is normal. The determination flag f of "1" indicates that the RF signal is abnormal, and that the pick-up 3 has not normally read the data from the optical disk 100. After the above-described operation, the determination operation is executed (S4 to S17).

As described above, in the CD-ROM format, the mismatch by + or −10 frames between the subcode address and the sector number is permitted. Since the signal processing unit 5 cannot identify the sector number, the system control unit 8 needs to specify the subcode address corresponding to the selected sector number to execute seeking operation. Consequently, the system control unit 8 sets the subcode address k=(the sector number t selected in step 1)−(10 frames), and instructs the pick-up 3 to perform the seeking operation (S4).

In response to the instruction of the system control unit 8, the signal processing unit 5 drives the driver 4 and controls the motor 2 and the pick-up 3. As a result, the pick-up 3 irradiates the beam light at the physical position indicated by the subcode address specified in step S3 to generate the reproduction signal.

Upon receiving the reproduction signal, the signal processing unit 5 generates the RF signal. The signal processing unit 5 further applies the EFM demodulation to generate the main data and the subcode. Subsequently, the signal processing unit 5 outputs the main data to the CD-ROM decoder 7. Upon receiving the main data, the CD-ROM decoder 7 decodes the same.

The CD-ROM determining unit 10 receives the decoded main data. The CD-ROM determining unit 10 then determines whether or not the decoded main data is in the CD-ROM format. Specifically, the CD-ROM determining unit 10 detects the sync pattern from the decoded main data. When the sync pattern is detected, the CD-ROM determining unit 10 determines that the decoded main data is in the CD-ROM format, and outputs a decoding OK signal.

Moreover, when the sync pattern is detected, the CD-ROM determining unit 10 may further determine whether or not the main data has a normal sector structure utilizing an error checking code included in the main data by a well-known method. If the main data has a normal sector structure, the CD-ROM decoder 7 outputs the decoding OK signal.

After instructing the seeking operation in step S4, the system control unit 8 monitors input of the decoding OK signal for a predetermined time (S5). When the decoding OK signal is inputted in the system control unit 8 within the predetermined time (YES in S5), the system control unit 8 determines that the CD-ROM format data is recorded at the physical position corresponding to the subcode address specified in step S4 on the optical disk 100 (S14).

On the other hand, if the decoding OK signal is not inputted within the predetermined time (NO in S5), the CD-DA format data is recorded at the physical position corresponding to the specified subcode address, or the pick-up 3 has not normally read the data. Consequently, the system control unit 8 determines whether or not the CD-DA format data is recorded at the physical position corresponding to the specified subcode address (S6 to S17).

The system control unit 8 outputs a reproduction-signal determination instruction to the reproduction signal determining unit 9 (S6). The reproduction signal determining unit 9, which has received the reproduction-signal determination instruction, determines whether or not the reproduction signal is normal, based on the RF signal, and notifies the system control unit 8 of the result. Hereinafter, as one example of the determination method of the reproduction signal determining unit 9, determination by the above-described method (2) is described in detail.

The reproduction signal determining unit 9 measures the amplitude of the RF signal in ms order (e.g., 1 ms), for example, to determine whether or not the measured amplitude is larger than a reference value Vr.

Figure 3:
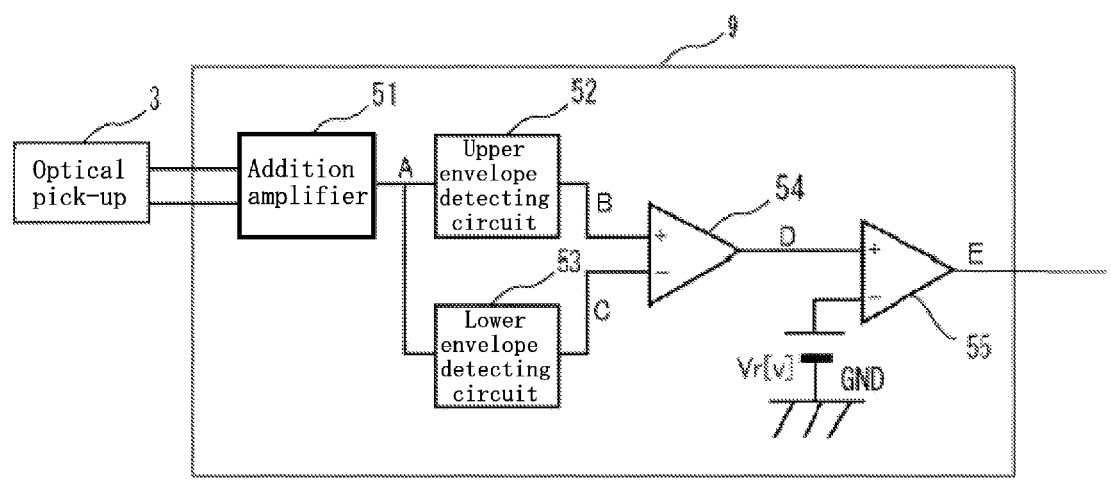
FIG. 3 is a configuration diagram of a reproduction signal determining unit in the format determining apparatus shown in FIG. 1.

FIG. 3 is a functional block diagram of the reproduction signal determining unit 9 when the determination is performed by the above-described method (2). Moreover, FIG. 4 is a timing diagram of signals generated in the reproduction signal determining unit 9 shown in FIG. 3.

Figure 4:
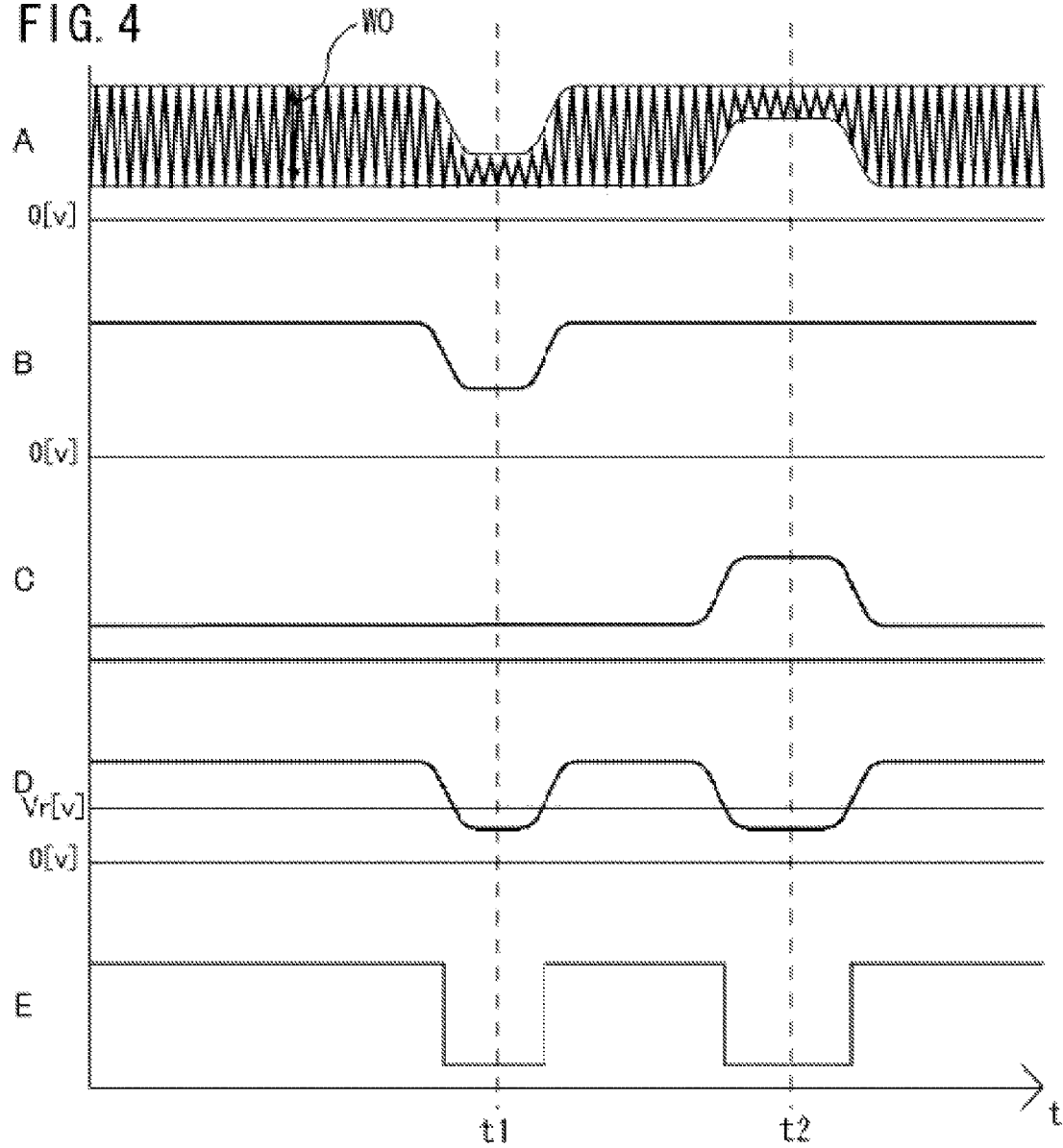
FIG. 4 is a timing chart diagram of signals generated in the reproduction signal determining unit shown in FIG. 3.

Referring to FIGS. 3 and 4, the reproduction signal determining unit 9 includes an addition amplifier 51, an upper envelope detecting circuit 52, a lower envelope detecting circuit 53, a subtraction circuit 54, and a comparator 55. The light-receiving element of the pick-up 3 includes a plurality of photodetectors. The respective photodetectors receive the reflected light and output the reproduction signals in accordance with the intensity of the reflected light. The addition amplifier 51 adds the reproduction signals outputted from the plurality of photodetectors, and outputs an RF signal A as shown in FIG. 4.

When the RF signal is seen in ms order, an upper envelope and a lower envelope of the RF signal generated from the normal reproduction signal are each at a stable certain level. The amplitude of the RF signal at this time is assumed to be W0 (refer to FIG. 4). When a scratch is formed on a surface of the optical disk 100, or when dirt lower in reflectance is attached thereto, the intensity of the reflected light becomes low. As a result, a level of the upper envelope of the RF signal decreases (refer to at a time t1 in FIG. 4). In this case, the amplitude of the RF signal becomes smaller than W0.

Moreover, when dirt high in reflectance is attached on the surface of the optical disk 100, or when the laser light is away from a pit string, the intensity of the reflected light increases. This increases the level of the lower envelope of the RF signal, as shown at a time t2 in FIG. 4. As a result, the amplitude of the RF signal becomes smaller than W0.

In short, when the pick-up 3 has not normally read the data of the optical disk 100, the amplitude of the RF signal becomes smaller as compared with the normal case.

Consequently, the reproduction signal determining unit 9 determines whether or not the amplitude of the RF signal is larger than the reference value Vr, using the upper envelope detecting circuit 52, the lower envelope detecting circuit 53, the subtraction circuit 54, and the comparator 55.

Upon receiving the RF signal A, the upper envelope detecting circuit 52 generates a peak envelope waveform signal B, which is the upper envelope of the RF signal (refer to FIG. 4).

The lower envelope detecting circuit 53 generates a bottom envelope waveform signal C, which is the lower envelope of the RF signal. The subtraction circuit 54 subtracts the bottom envelope waveform signal C from the peak envelope waveform signal B to generate an amplitude waveform signal D.

The comparator 55 compares a level of the amplitude waveform signal D with the reference value Vr, and determines whether or not the RF signal is normal. If the level of the amplitude waveform signal D is higher than the reference value Vr, that is, if the reproduction signal is normal, the comparator 55 outputs a determination signal at an H (High) level. On the other hand, if the amplitude waveform signal D is lower than the reference level Vr, that is, if the reproduction signal is abnormal, the comparator 55 outputs the determination signal at an L (Low) level.

Referring back to FIG. 2, in step S6, the system control unit 8 receives the determination signal from the reproduction signal determining unit 9. If the determination signal is at the H level (YES in S7), the system control unit 8 goes to step S9. On the other hand, if the determination signal is at the L level (NO in S7), the system control unit 8 updates the determination flag to "1" (S8), and goes to step S9. In short, the system control unit 8 updates the determination flag, based on the determination signal.

In step S9, the system control unit 8 determines whether or not the sought subcode address k is the variable t+10 frames (S9). If the subcode address k is not the variable t+10 frames (NO in S9), the processing returns to step S5. In the CD-DA, and the CD-ROM, the subcodes are spirally arranged in the order of k, k+1 frame, k+2 frames, . . . . Therefore, the pick-up 3 irradiates the beam light to a physical position of the subcode address k=k+1 frame (i.e., k=t−9 frames) 1/75 second after the pick-up 3 irradiates the beam light to a physical position of the subcode address k. The pick-up 3 reads the data at the physical position of the subcode address k=t−9 frames, and generates the reproduction signal. The system control unit 8 advances the operation in steps S5 to S16, using the generated RF signal.

That is, the pick-up 3 irradiates the beam light to the physical positions of the subcode address k=t−10 frames to subcode address k=t+10 frames every 1/75 second to generate the reproduction signals. The system control unit 8 executes the operation in steps S5 to S16 to the respective generated reproduction signals. In short, the determination processing is performed as to a range of mismatch (t−10 frames≦k≦t+10 frames: hereinafter, referred to as a permissible range) between the subcode address and the sector number, which is permitted in the standard of the CD-ROM format.

After the determination in step S7 has been performed to all the subcode addresses within the permissible range (YES in S9), the system control unit 8 determines whether or not the determination flag f is "0" (S10). If the determination flag is "0" (YES in S10), the reproduction signal is normal. Accordingly, the system control unit 8 determines that the data of the selected sector number is in the CD-DA format (S17).

On the other hand, if it is determined that the determination flag is "1" in step S10 (NO in S10), the generated RF signal and the reproduction signal are abnormal. The abnormal reproduction signal is caused by a defect (scratch, dirt and the like) on the optical disk 100, or for some reason, for example, by failure in reading of the data by the pick-up 3 due to outside impact or the like. Consequently, the system control unit 8 decrements the variable c indicating the number of times of retrial in the determination operation to c−1 (S11), and repeats the operation in S3 to S10 until the variable c indicating the number of times of retrial becomes 0 (YES in S12). When the variable c becomes 0, the system control unit 8 determines that the main data does not have the sector structure (S13). In this case, the main data is in the CD-DA format, or the reproduction signal is abnormal for some reason.

According to the above-described operation, when the main data does not have the sector structure, that is, when the main data is not in the CD-ROM format, the format determining apparatus 1 can determine whether or not the reproduction signal is normal, and when the reproduction signal is normal, the format determining apparatus 1 can determine that the main data is in the CD-DA format. Accordingly, when the data is in the CD-DA format, the determination processing time can be reduced.

Second Embodiment

In the forgoing embodiment, in step S6 in the FIG. 2, the reproduction signal determining unit 9 which has received the reproduction-signal determination instruction, performs the determination by the above-described method (2). However, the reproduction signal determining unit 9 may determine whether or not the reproduction signal is normal by the methods (1), (3) to (5). Hereinafter, a detailed description of operation of the format determining apparatus 1 when the reproduction signal determining unit 9 determines whether or not the reproduction signal is normal by the above-described method (3) is given.

Figure 5:
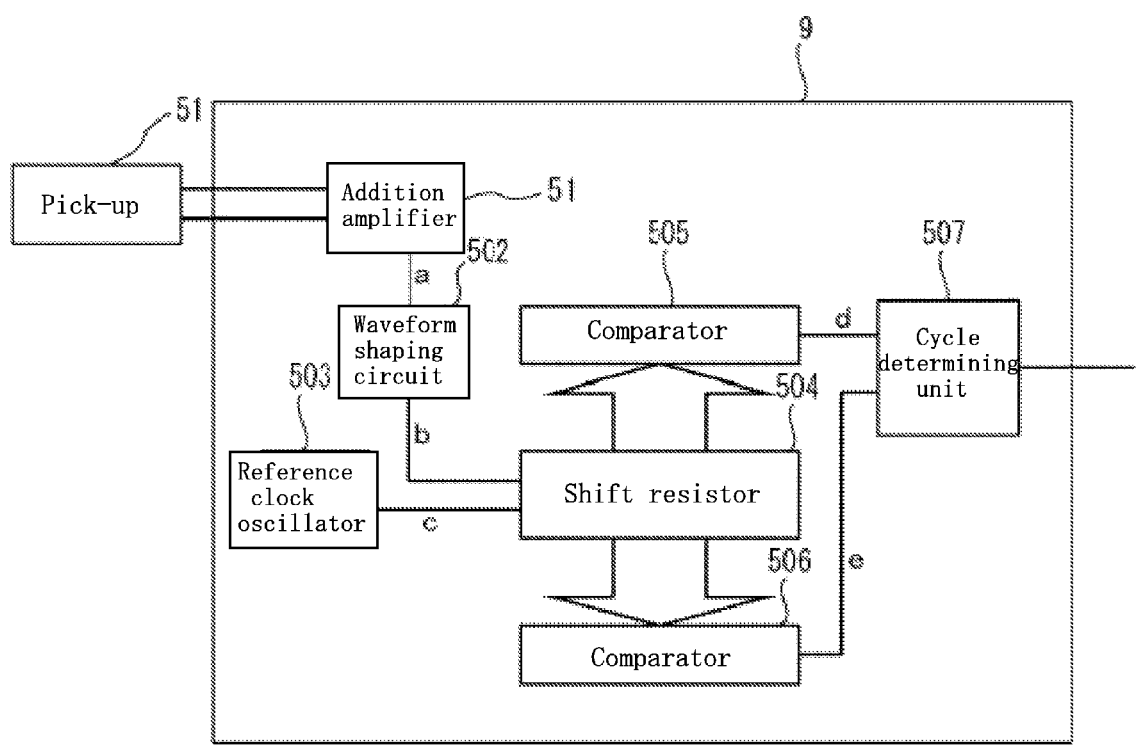
FIG. 5 is a configuration diagram of the reproduction signal determining unit in a second embodiment.

FIG. 5 is a functional block diagram of the reproduction signal determining unit 9 in the present embodiment. Moreover, FIG. 6 is a timing chart of signals generated in the reproduction signal determining unit 9 shown in FIG. 5.

Referring to FIG. 5, the reproduction signal determining unit 9 includes the addition amplifier 51, a waveform shaping circuit 502, a reference clock oscillator 503, a shift resistor 504, a frame sync comparator 505, a subcode frame sync comparator 506, and a cycle determining unit 507.

As in FIG. 3, the addition amplifier 51 generates an RF signal a (refer to FIG. 6). The RF signal in FIG. 6 is indicated in ns (nanosecond) order. The waveform shaping circuit 502 binarizes the RF signal to generate a rectangular waveform signal b.

The reference clock oscillator 503 generates a reference clock c. The reference clock oscillator 503 is, for example, a well-known oscillator using crystal or the like. As shown in FIG. 6, a cycle of the reference clock c is shorter than a cycle of the rectangular waveform signal b.

The shift resistor 504 samples the rectangular waveform signal b, based on the reference clock c. Specifically, the shift resistor 504 includes a plurality of resistors to take in the rectangular waveform signal b at a rising edge of the reference clock c. This operation allows bit data of "0" or "1" to be sequentially stored in the shift resistor 504 every rising of the reference clock c.

Here, suppose that the frame sync signal in the present embodiment is of 22 bits, and that the subcode frame sync signal is of 14 bits. In this case, the shift resistor 504 outputs the bit data of 22 bits from the tailing resistor of the shift resistor 504 to the frame sync comparator 505 every time the bit data is taken in. The shift resistor 504 further outputs the bit data of 14 bits from the tailing resistor of the shift resistor 504 to the subcode frame sync comparator 506 every time the bit data is taken in.

Every time the frame sync comparator 505 receives a data string from the shift resistor 504, the frame sync comparator 505 compares the received data string with a bit pattern (22 bits) of the frame sync signal on the standard. The CD-DA format and the CD-ROM format are the same in bit pattern of the frame sync signal. As a comparative result, if both matches each other, the frame sync comparator 505 outputs a first sensing signal d at an H level.

Similarly, every time the subcode frame sync comparator 506 receives a data string from the shift resistor 504, the subcode frame sync comparator 506 compares the received data string with a bit pattern (14 bits) of the subcode frame sync signal on the standard. The CD-DA format and the CD-ROM format are the same in bit pattern of the subcode frame sync signal. As a comparative result, if both match each other, the subcode frame sync comparator 506 outputs a second sensing signal e at an H level.

The cycle determining unit 507 receives the first sensing signal d at the H level and the second sensing signal e at the H level. When a cycle of the first sensing signal d at the H level matches the cycle of the frame sync signal ($1/7350$ second) and a cycle of the second sensing signal e at the H level matches the cycle of the subcode frame signal ($1/75$ second), the cycle determining unit 507 outputs the determination signal at an H level to the system control unit 8.

The operation in step S7 and later in FIG. 2 is the same as that in the first embodiment.

In the foregoing embodiment, the cycle determining unit 507 senses the frame sync signal and the subcode frame sync signal. However, only one of the sync signals may be sensed. For example, the cycle determining unit 507 may determine whether or not the cycle of the first sensing signal d matches the cycle of the frame sync signal without performing the determination for the second sensing signal e, and vice versa.

While in the present embodiment, the cycle determining unit 507 is included in the reproduction signal determining unit 9, the cycle determining unit 507 may be included in the system control unit 8 in place of the reproduction signal determining unit 9.

While as described above, the embodiments of the present invention are described, the foregoing embodiments are only illustrative for carrying out the present invention. Thus, the present invention is not limited to the foregoing embodiments, and can be carried out by appropriately modifying the foregoing embodiments within a range not departing from the gist.

What is claimed is:

1. A format determining apparatus for decoding data in a CD-DA format and data in a CD-ROM format, comprising:
    a pick-up that irradiates light to an optical disk to generate a reproduction signal in accordance with reflected light;
    a signal processing unit that decodes said reproduction signal to generate main data;
    a main data decoding unit that decodes said main data;
    a CD-ROM determining unit that determines whether or not said main data is in the CD-ROM format, based on said decoded main data;
    a reproduction signal determining unit that determines whether or not said reproduction signal is normal when said main data is not in the CD-ROM format; and
    a format determining unit that determines that said main data is in the CD-DA format when said main data is not in the CD-ROM format and when said reproduction signal is normal.

2. The format determining apparatus according to claim 1, wherein the data in said CD-ROM format includes a sector number and a subcode address corresponding to the sector number, and the data in said CD-DA format includes said subcode address,
    said pick-up irradiates the light to physical positions of said optical disk indicated by a plurality of subcode address corresponding to a plurality of sector numbers in a predetermined range including a selected sector number to generate a plurality of reproduction signals, and
    when the main data corresponding to each of said physical positions is not in the CD-ROM format, and when each of said reproduction signals corresponding to each of said physical positions is normal, said format determining unit determines that said main data is in the CD-DA format.

3. The format determining apparatus according to claim 1, wherein said reproduction signal determining unit determines that said reproduction signal is normal when an amplitude of said reproduction signal is larger than a reference value.

4. The format determining apparatus according to claim 1, wherein said reproduction signal determining unit further comprises a detection unit that samples said reproduction signal to detect a signal of the same bit pattern as that of a sync signal, and
    said reproduction signal determining unit determines that the reproduction signal is normal when a cycle of said detected signal is the same as a cycle of the sync signal.

* * * * *